US009864510B2

(12) United States Patent
Seif et al.

(10) Patent No.: US 9,864,510 B2
(45) Date of Patent: Jan. 9, 2018

(54) SYSTEM AND METHOD FOR CONNECTING AND INTRODUCING TRUSTED CONTACTS

(71) Applicant: Swishlinks LLC., Chicago, IL (US)

(72) Inventors: Charbel Seif, Chicago, IL (US); Ali Shahanaghi, Chicago, IL (US)

(73) Assignee: Swishlinks LLC, Chicago, IL (US)

( * ) Notice: Subject to any disclaimer, the term of this patent is extended or adjusted under 35 U.S.C. 154(b) by 0 days.

(21) Appl. No.: 15/225,337

(22) Filed: Aug. 1, 2016

(65) Prior Publication Data

US 2017/0308283 A1    Oct. 26, 2017

Related U.S. Application Data

(60) Provisional application No. 62/325,382, filed on Apr. 20, 2016.

(51) Int. Cl.
| | |
|---|---|
| G06F 3/0488 | (2013.01) |
| G06F 3/0482 | (2013.01) |
| H04L 29/06 | (2006.01) |
| G06Q 20/10 | (2012.01) |
| G06Q 20/22 | (2012.01) |

(52) U.S. Cl.
CPC ........ *G06F 3/04883* (2013.01); *G06F 3/0482* (2013.01); *H04L 65/1069* (2013.01); *G06F 2203/04104* (2013.01); *G06F 2203/04808* (2013.01); *G06Q 20/10* (2013.01); *G06Q 20/223* (2013.01)

(58) Field of Classification Search
None
See application file for complete search history.

(56) References Cited

U.S. PATENT DOCUMENTS

| | | | | |
|---|---|---|---|---|
| 8,473,370 | B1 * | 6/2013 | Altendorf | .......... G06Q 30/0633 705/26.1 |
| 9,052,806 | B2 | 6/2015 | Tseng | |
| 9,335,862 | B1 * | 5/2016 | Kritt | ..................... G06F 3/0416 |
| 2010/0246571 | A1 * | 9/2010 | Geppert | .............. G06F 3/04817 370/352 |
| 2013/0021951 | A1 | 1/2013 | Altberg et al. | |
| 2014/0160033 | A1 | 6/2014 | Brikman et al. | |

(Continued)

OTHER PUBLICATIONS

International Search Report and Written Opinion dated Jan. 17, 2017 in corresponding international application PCT/US16/45013.

*Primary Examiner* — Jeffrey A Gaffin
*Assistant Examiner* — John M Heffington
(74) *Attorney, Agent, or Firm* — McDermott Will & Emery LLP

(57) ABSTRACT

An introduction or connection platform is described that improves the performance of a mobile device having a touchscreen by reducing the number of user inputs needed and also the amount of memory required for making connections in Apps that are used with backend databases. Examples of the subject technology include or provide: (1) an application for a mobile device that provides for a simple way to introduce someone to someone else (or multiple people); and (2) a mobile application that provides for receiving as a user input a simple swipe (e.g., finger or other digit being swept across the mobile's touch screen) in order to introduce someone in response to a post (e.g., a person looking for someone with a certain skill and/or experience set). Exemplary embodiments are implemented on a mobile device.

24 Claims, 10 Drawing Sheets

(56) References Cited

U.S. PATENT DOCUMENTS

2015/0081525 A1* 3/2015 Helwick ............... G06Q 20/10
  705/39
2015/0119007 A1    4/2015 Kwon et al.
2015/0149930 A1    5/2015 Walkin et al.

* cited by examiner

500A

500B

500C

600A

| ✏ UPDATE STATUS | 🖼 ADD PHOTOS/VIDEOS | 🖼 CREATE PHOTO ALBUM |

I'M LOOKING FOR A PHOTOGRAPHER. CAN SOMEONE HELP ME OUT? @amanda

AMANDA

AMANDA

AMANDA

AMANDA

AMANDA CERNY ✓
3,511,286 LIKE THIS - LOS ANGELES, CALIF: ACTOR DIRECTOR

AMANDA DIAZ PHOTOGRAPHY ✓
451,031 LIKE THIS : ARTIST

AMANDA BYNES
206,546 LIKE THIS : PUBLIC FIGURE

AMANDA SAGE
270,642 LIKE THIS : ARTIST

AMANDA'S PLACE
98 LIKE THIS - 13 PEOPLE CHECKED IN HERE - SOUTH BUCKTOWN, CHICAGO, ILL

AMANDA HOWARTH HAIR & MAKEUP
141 LIKE THIS - 3 PEOPLE CHECKED IN HERE - CHICAGOLAND AREA, CHICAGO, ILL

NON CONNECTIONS ONCLUDING: PUBLIC FIGURES, FACEBOOK PAGES AND PLACES.

TO: | RECIPIENT 1 | RECIPIENT 2 |

I THINK YOU GUYS WOULD WORK REALLY WELL TOGETHER.

FIG. 6B

SYSTEM AND METHOD FOR CONNECTING AND INTRODUCING TRUSTED CONTACTS

CROSS-REFERENCE TO RELATED APPLICATION

This application claims the benefit of U.S. provisional patent application No. 62/325,382, entitled "System and Method for Connecting and Introducing Trusted Contacts," filed 20 Apr. 2016, the entire content of which is incorporated herein by reference.

BACKGROUND

Technical Field

This disclosure relates to systems and methods for making or implementing connections, e.g., introducing trusted individuals, in software applications and databases using touchscreens of mobile devices, such as cellular phones, tablets, or the like.

Description of Related Art

The usage of mobile wireless devices has increased greatly and progressed to the point where, for some geographic regions, most people have at least one mobile device, e.g., a smart phone, personal digital assistant (PDA), or a tablet. Users commonly install or have installed various software applications (a.k.a. "Apps") on those devices. Notable examples of Apps include those that provide access to and use of social media such as Facebook, Myspace, and LinkedIn, to name just a few.

Social media have developed various ways for users to connect with one another. For example, social media applications such as Facebook and LinkedIn provide ways for their users to connect to one another. Such approaches, however, present difficulties and limitations when implemented on mobile devices. Limitations arise from the limited touchscreen space available to a user when working with a software application resident on a mobile device, often requiring the use of many user input screens (e.g., "dropdowns")—with attendant memory requirements—for even simple navigation and use of the Apps on the mobile devices. Those memory requirements include not only the so-called "frontend," referring to the mobile device itself, but also the "backend," referring to a server and one or more databases that the front end communicates with.

As an example of limitations in the social media context, people presently face issues while making introductions to or receiving introductions from other people in the social media network, directly or indirectly, possibly involving one or more intermediary people for the latter situation. A person may make an introduction and ask permission from each of the introduced to see if both parties want to be introduced. This takes extra effort on the part of the introducer to ensure that all parties have given permission to give out their contact information. A person may also make an introduction and not ask permission from either user. This can lead to a few different outcomes: (A) one of the introduced parties may not desire someone reaching out to them and is placed in an awkward situation stating "No, I'm sorry, I am not interested in communicating with you"; (B) if the foregoing scenario happens, the introducer is also put in an awkward situation trying to balance his relationship between the introduced parties; (C) one of the introduced parties may not have wanted a specific contact point to be given out (e.g., someone gives out a personal phone number instead of a work email address); and (D) a person may make an introduction and not provide enough contextual information to the introduced parties to show that the introduction is valuable or mutually beneficial to all parties.

Using a mobile device to make connections, through its resident Apps, between members or items in one group with members or items of another group has typically involved the use of three lists: one for each of the different groups, and a separate one for listing the connections. Each list of groups has typically required a separate dropdown screen for the user, and also a table in memory. The more memory used by the App(s) on the mobile device, the more memory is needed for the database(s) and related server(s) on the backend to which the App(s) are linked and the more data is needed to be sent wirelessly to and from the mobile device. These represent factors slowing down performance of the App(s), server(s) and database(s).

SUMMARY

One aspect of the subject technology of present disclosure provides an introduction or connection platform that improves the performance of a mobile device having a touchscreen by reducing the number of user inputs needed and also the amount of memory required for making connections in Apps resident on that mobile device and that are used with backend databases.

Examples of the subject technology include or provide: (1) an application (App) for a mobile device that provides for a simple way to introduce someone to someone else (or multiple people); and (2) a mobile application that provides for receiving as a user input a simple swipe (e.g., finger or other digit being swept across the mobile's touch screen) in order to introduce someone in response to a post (e.g., a person looking for someone with a certain skill and/or experience set). Exemplary embodiments are implemented on a mobile device.

These, as well as other components, steps, features, benefits, and advantages, will now become clear from a review of the following detailed description of illustrative embodiments, the accompanying drawings, and the claims.

An example of a computer-implemented memory-efficient method utilizing a touchscreen for connecting users within a network of users is provided. The method may include:

monitoring a user input area of a touchscreen user interface;

from the user input area, receiving a user indication that a connection between a seeker and a provider is to be made;

in response to the user connection indication, importing a list of contacts and displaying the list in the user interface;

after displaying the list and while monitoring the user input area, receiving a first user swipe input as a detected first user-finger-dragging motion;

verifying that the time elapsed between the beginning and completion of the first user-finger-dragging motion is within a predetermined range and constitutes a single continuous motion, thereby recognizing a first swipe motion;

upon verifying the time and continuity of the user's first swipe motion, indicating in the user interface a selection of a provider;

while continuing to monitor the user input area, receiving a second user swipe input as a detected second user-finger-dragging motion;

verifying that the time elapsed between the beginning and completion of the second user-finger-dragging motion is within a predetermined amount of time and constitutes a single continuous motion, thereby recognizing a second swipe motion;

upon verifying the time and continuity of the user's second swipe motion, indicating in the user interface a selection of a seeker;

after indication of the selection of the seeker, receiving a user input initiating electronic transmission of an introduction message to the selected seeker;

receiving an electronic acceptance of the introduction message from the selected seeker;

after receiving the electronic acceptance from the seeker, electronically sending a request to the provider to accept or decline the introduction;

receiving an electronic acceptance of the introduction message from the provider; and in response to the provider accepting the introduction, displaying a visual indication on the graphical user interface indicating that the provider and seeker are connected.

The noted method may include that the first swipe motion is from left to right on the mobile touch screen. The noted method may include that the second swipe motion is from right to left on the mobile touch screen. The noted method may include that the first swipe motion is from right to left on the mobile touch screen. The noted method may include that the second swipe motion is from left to right on the mobile touch screen. The noted method may include revising a database linked to the user interface to indicate that the provider and seeker are connected. The noted method may include that verifying the user's first swipe motion further includes verifying that the angle of the swipe motion with respect to a horizontal axis of the user interface is within a predetermined range. The noted method may include that verifying the user's second swipe motion further includes verifying that the angle of the swipe motion with respect to a horizontal axis of the user interface is within a predetermined range.

An example of a non-transitory, tangible, computer-readable storage medium containing a program of instructions that causes a computer system having a processor running the program of instructions to perform the instructions is provided; the program may include instruction to:

monitor a user input area of a touchscreen user interface;

from the user input area, receive a user indication that a connection between a seeker and a provider is to be made;

in response to the user connection indication, import a list of contacts and display the list in the user interface;

after the list of contacts is displayed and while the user input area is monitored, receive a first user swipe input as a detected first user-finger-dragging motion;

verify that the time elapsed between the beginning and completion of the first user-finger-dragging motion is within a predetermined range and constitutes a single continuous motion, thereby recognizing a first swipe motion;

upon verification of the time and continuity of the user's first swipe motion, indicate in the user interface a selection of a provider;

while continuing to monitor the user input area, receive a second user swipe input as a detected second user-finger-dragging motion;

verify that the time elapsed between the beginning and completion of the second user-finger-dragging motion is within a predetermined amount of time and constitutes a single continuous motion, thereby recognizing a second swipe motion;

upon verification of the time and continuity of the user's second swipe motion, indicate in the user interface a selection of a seeker;

after indication of the selection of the seeker, receive a user input initiating electronic transmission of an introduction message to the selected seeker;

receive an electronic acceptance of the introduction message from the selected seeker;

after receipt of the electronic acceptance from the seeker, electronically send a request to the provider to accept or decline the introduction;

receive an electronic acceptance of the introduction message from the provider; and in response to the provider acceptance of the introduction, display a visual indication on the graphical user interface indicating that the provider and seeker are connected.

The noted non-transitory, tangible, computer-readable storage medium may include that the program further includes instructions to recognize a finger-dragging motion from left to right on the mobile touch screen as the first swipe motion. The noted non-transitory, tangible, computer-readable storage medium may include that the program further includes instructions to recognize a finger-dragging motion from right to left on the mobile touch screen as the second swipe motion. The noted non-transitory, tangible, computer-readable storage medium may include that the program further includes instructions to recognize a finger-dragging motion from right to left on the mobile touch screen as the first swipe motion. The noted non-transitory, tangible, computer-readable storage medium may include that the program further includes instructions to recognize a finger-dragging motion from left to right on the mobile touch screen as the second swipe motion. The noted non-transitory, tangible, computer-readable storage medium may include that the program further includes instructions to revise a database linked to the user interface to indicate that the provider and seeker are connected. The noted non-transitory, tangible, computer-readable storage medium may include that the program further includes instructions to verify the user's first swipe motion by verifying that the angle of the swipe motion with respect to a horizontal axis of the user interface is within a predetermined range. The noted non-transitory, tangible, computer-readable storage medium may include that the program further includes instructions to verify the user's first swipe motion by verifying that the angle of the swipe motion with respect to a horizontal axis of the user interface is within a predetermined range.

A computing device is provided that may include:

a touchscreen having a touchscreen user interface;

one or more processors;

memory; and one or more programs, with the one or more programs being stored in the memory and configured to be executed by the one or more processors, the one or more programs including: instructions for:

monitoring a user input area of the touchscreen user interface;

from the user input area, receiving a user indication that a connection between a seeker and a provider is to be made;

in response to the user connection indication, importing a list of contacts and displaying the list in the user interface;

after displaying the list and while monitoring the user input area, receiving a first user swipe input as a detected first user-finger-dragging motion;

verifying that the time elapsed between the beginning and completion of the first user-finger-dragging motion is within a predetermined range and constitutes a single continuous motion, thereby recognizing a first swipe motion;

upon verifying the time and continuity of the user's first swipe motion, indicating in the user interface a selection of a provider;

while continuing to monitor the user input area, receiving a second user swipe input as a detected second user-finger-dragging motion;

verifying that the time elapsed between the beginning and completion of the second user-finger-dragging motion is within a predetermined amount of time and constitutes a single continuous motion, thereby recognizing a second swipe motion;

upon verifying the time and continuity of the user's second swipe motion, indicating in the user interface a selection of a seeker;

after indication of the selection of the seeker, receiving a user input initiating electronic transmission of an introduction message to the selected seeker;

receiving an electronic acceptance of the introduction message from the selected seeker;

after receiving the electronic acceptance from the seeker, electronically sending a request to the provider to accept or decline the introduction;

receiving an electronic acceptance of the introduction message from the provider; and in response to the provider accepting the introduction, displaying a visual indication on the graphical user interface indicating that the provider and seeker are connected.

The noted computing device may include instructions that the first swipe motion is from left to right on the mobile touch screen. The noted computing device may include instructions that the second swipe motion is from right to left on the mobile touch screen. The noted computing device may include instructions that the first swipe motion is from right to left on the mobile touch screen. The noted computing device may include instructions that the second swipe motion is from left to right on the mobile touch screen. The noted computing device may include instructions for revising a database linked to the user interface to indicate that the provider and seeker are connected. The noted computing device may include instructions that verifying the user's first swipe motion further includes verifying that the angle of the swipe motion with respect to a horizontal axis of the user interface is within a predetermined range. The noted computing device may include instructions that verifying the user's second swipe motion further includes verifying that the angle of the swipe motion with respect to a horizontal axis of the user interface is within a predetermined range.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 6A-C depict various differences between an example of the subject technology and another prior-art software application.

DETAILED DESCRIPTION OF ILLUSTRATIVE EMBODIMENTS

Figure 1:
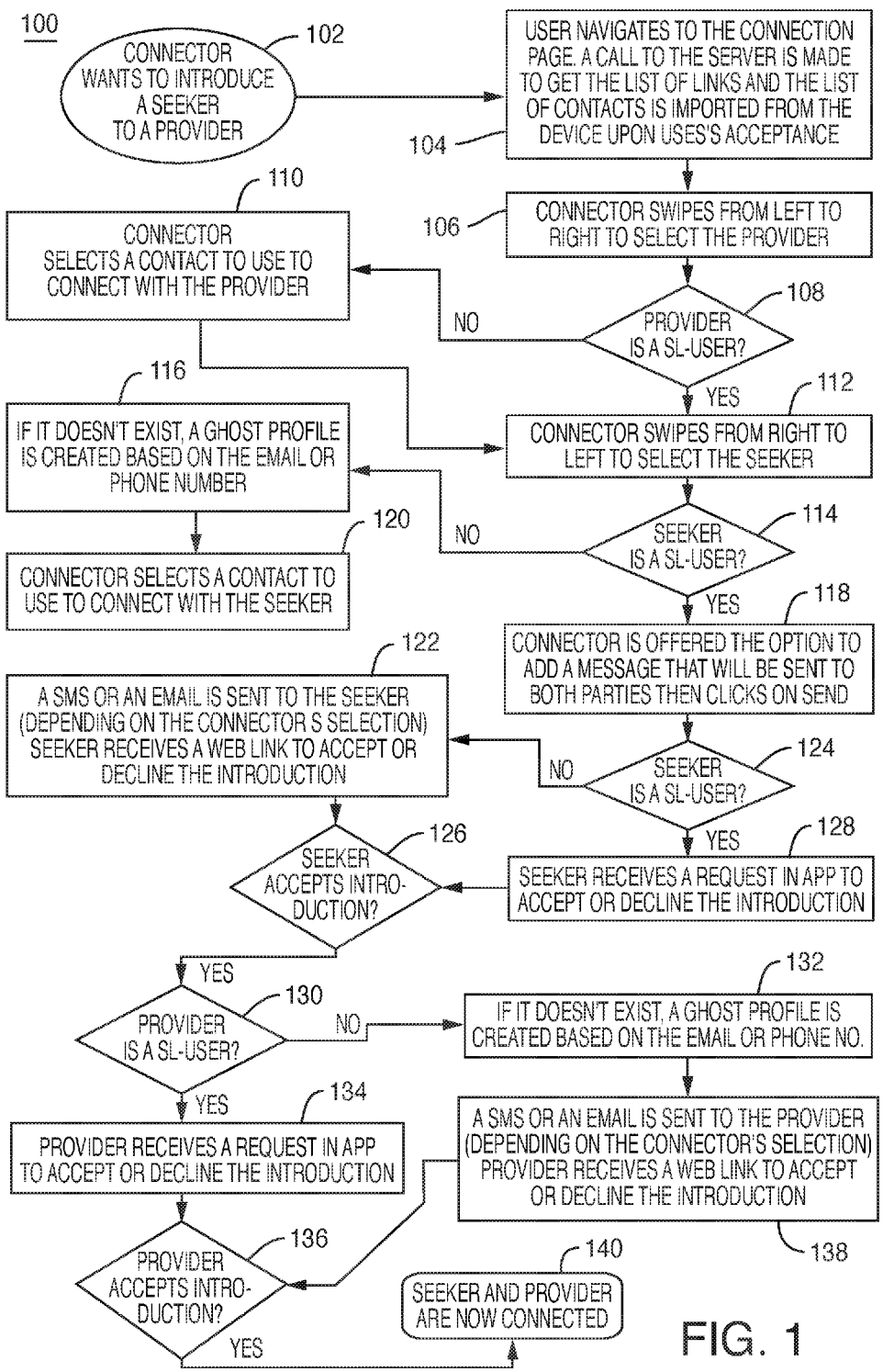
FIG. 1 is a flow chart that illustrates an example of a process of introducing a Seeker to a Provider.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

One aspect of the subject technology of present disclosure provides an introduction or connection platform (App) that improves the performance of a mobile device having a touchscreen by reducing the number of user inputs needed and also the amount of memory required for making connections in Apps that are resident on the mobile device and used with one or more backend databases.

Aspects of the disclosure offer advantages, including technical improvements in the performance of the both the frontend and the backend (database and operating system). These technical advantages include but are not limited to the following: (1) Using fewer steps on the frontend (fewer user inputs and steps in a mobile app), results in fewer calls to the backend server, and therefore the backend will perform better (more quickly, all other factors being the same); (2) The new way to connect A to B has an impact on the backend architecture and how the database is designed, optimizing its performance; the server and/or database can be smaller; and/or (3) The need for fewer tables in memory .

Expanding on the third technical advantage noted above, the link between one or more members of a first group or list (e.g., user A) to one or more members of another group or list (e.g., user B), in the past for prior techniques, would have required two (2) tables: one containing a list of members of the first group or list; and one containing a list of members of users of the second group or list. An aspect of the subject technology does away with the need for two tables and treats both lists as being one (combines into one); and, that in turn can have a major implication on the size of the database that is used for the table and the interaction that can happen. Embodiments of the disclosure accordingly increase the performance of an application (App) accessed with a touch-screen and working with a database and server. For example, the disclosure provides for the use of fewer tables, which in turn uses a less amount of memory (e.g., storage space on a disk or a RAM unit). Fewer tables require less memory to load those tables (e.g., into storage space on a disk or a RAM unit). Use of embodiments of the disclosure also provides for less memory needed to link users, e.g., of an App, since instead of needing three (3) tables, links (indicating the connections) can be stored in a second table, without the need for a third table. Fewer links allows for a user (or an App) having faster access to information. Fewer tables or indexes results in making running statistics faster.

Embodiments of the disclosure address and overcome specific technical limitations of touchscreens such as used on the majority of present-day mobile devices, e.g., cellular phones, PDAs, and/or tablets and the like. Many of these limitations arise in the context of using a mobile device's (e.g., a cellular phone's) touchscreen to navigate and use the functionality of one or more social networks, for example, as accessed by one or more Apps resident on the mobile device.

As noted previously, people presently face issues while making introductions to or receiving introductions from other people in networks, e.g., social media networks, directly or indirectly, possibly involving one or more intermediary people in the network for the latter. A person may make an introduction and ask permission from each of the introduced to see if both parties want to be introduced. This takes extra effort on the part of the introducer to ensure that all parties have given permission to give out their contact information. A person may also make an introduction and not ask permission from either user. This can lead to a few different outcomes: (A) One of the introduced parties may not desire someone reaching out to them and is placed in an awkward situation, e.g., stating "No, I'm sorry, I am not interested in communicating with you"; (B) if the foregoing scenario happens, the introducer is also put in an awkward situation trying to balance his relationship between the introduced parties; (C) one of the introduced parties may not have wanted a specific contact point to be given out (e.g., someone gives out a personal phone number instead of a work email address.); and, (D) a person may make an introduction and not provide enough contextual information to the introduced parties to show that the introduction is valuable or mutually beneficial to all parties.

Embodiments of the present disclosure solve these issues by providing an App (a.k.a. SwishLinks App) that provides the following:
(1) The introducer is provided with a tool that simplifies the introduction process, e.g., the user can simply swipe on two people, add a message, and is then done;
(2) By implementing a double-opt-in introduction, both introduced parties are asked (e.g., by the SwishLinks App) if they would like to be introduced in the first place;
(3) The contextual information necessary to facilitate the introduction is provided to the user(s); and
(4) The introduced parties are provided with the opportunity to determine what contact information (if any) they would like to share with the other party.

One aspect of the disclosure provides a novel set of steps (of method or process) and/or specially programmed apparatus (computing device) that apply to the specific environment of a touchscreen, e.g., of the size typically used for mobile cellular phones and the like.

Another aspect of the disclosure provides for the use of a single list—for the one or more members of a first group and also the one or more members of a second group—instead of two lists. Accordingly, on a small touchscreen (e.g., of a mobile cellular phone or tablet, etc.), anytime a user has the need to associate or map one (or many) from one list to one (or many) from another list, a relatively simple swipe gesture can be used as a simple and fast way to make connections between members or items on the single list, which has replaced a typical user interface for two separate lists, requiring two dropdown screens to appear on the touchscreen. As lists in Apps are typically represented by tables in memory, the need for fewer lists reduces the number of tables used in memory Further embodiments of the disclosure provide advantages/benefits for various actions utilizing a touchscreen, e.g., of a mobile cellular phone or tablet, etc., by providing a more general means (method, system, and/or apparatus) that allows a more efficient (time, memory, user inputs) way to connect one or more members or items of one group or list with or to one or more items or members of another group or list. Examples of the subject technology can be used by money transfer applications ("Apps") to transfer money. A software application according to the disclosure can be used by banks to pay bills. In such an example, a swipe to the left could select a particular account or accounts. A swipe right could select one or more payee(s).

An aspect of the disclosure provides benefits and advantages to Apps utilizing a touch screen. For example:
(1) Embodiments of the disclosure can increases the performance of the application (App) by reducing the needed steps to connect subject A to subject B; and
(2) An innovative platform, e.g., SwishLinks App, according to the present disclosure can provide users with an easy way to connect and share contacts without going through prior art steps such as phone calls and emails.

Embodiments of the present disclosure provide methods/ systems that are implemented on or with a mobile device and introduce a user, e.g., of a social media network (e.g., a Seeker) to another user (e.g., a Provider or multiple Providers). A third party (e.g., a Connector) can be a mediator, facilitating the connecting of the Seeker to the Provider. A mobile application according to the present disclosure (e.g., referred to as a "SwishLinks application" or "SwishLinks App") can allow a Connector to introduce a Seeker to a Provider (or multiple Providers); or vice versa by introducing the Provider to a Seeker. Two or more people may be connected (one to one, one to many, or many to one) with a simple gesture. Embodiments of the present disclosure can provide such connectivity with a minimized set of gestures required by a user, in contrast with prior techniques and applications. Of course while exemplary embodiments are described as introducing one user to another, the scope of the present disclosure is not limited to such. Other embodiments of the present disclosure may be utilized to introduce (i) a job to person, (ii) a business (e.g., a restaurant, company, etc.) to person, (iii) places (tourism, historic, etc.) to person, (iv) file sharing (e.g., pictures, videos, documents, etc.) to person, and/or (v) location (e.g., GPS location) to person, Furthermore, while exemplary embodiments are described herein in the context of one user sending information or connecting to a single other user, the present disclosure is not limited to such. For example, the following connection or mappings between users are included: (i) one-to-one; (ii) one-to-many; (iii) many-to-one; and, (iv) many-to-many.

FIG. 1 shows a flow chart for an exemplary embodiment of a process (or, method) 100 of introducing a user (e.g., a Seeker) to another user (e.g., a Provider) via the SwishLinks App.

As a high-level summary of process 100, once a user installs and opens the SwishLinks App on a mobile device (e.g., a smartphone, PDA, tablet, or the like), as a first time user, the user is invited to set up an account, and give the SwishLinks App access to their mobile device's contact(s). From the connections page, a user may be able to see and access their device's contact(s) as well as their Links. Playing the role of a Connector, the user selects the Seeker, e.g., by swiping their finger from the left to the right over the Seeker's name, then the user selects the Provider, e.g., by swiping their finger over the Provider's name from the right to left. For some applications this may be realized as a simple reciprocating motion or back-and-forth motion of a finger across the touchscreen. When these two simple gestures are completed, the SwishLinks-User is asked to enter an optional message that will be sent to both parties. When the send button is pressed the introduction process is initiated.

Referring to FIG. 1, process 100 is explained in more detail. A user acting as a Connector is indicated at 102 as wanting to introduce a Seeker to a Provider. The Seeker could be a person who is looking to find a provider of goods or services. The user navigates to the connection page, as shown at 104. A call is made to the server associated with the user's SwishLinks App to get the list of the user's links; the list of contacts is imported from the user's device upon the user granting access. The Connector selects a Provider, as shown at 106, by touching the touchscreen of the mobile device. In exemplary embodiments, the selection is made by the user swiping her or his finger, e.g., from left to right. The process 100 can consider whether the Provider is a SwishLinks User, as shown at 108 (as a question, with conditional branches to 110 and 112). If the Provider is not a SwishLinks User, the Connector can select a contact to use to connect with the Provider, as shown at 110. If the Provider is a SwishLinks User, the Connector can select the Seeker, e.g., by swiping his or her finger from right to left, as shown at 112. The process can consider whether the Seeker is a SwishLinks User, as shown at 114 (as a question, with conditional branches to 116 and 118). If the Seeker is not a SwishLinks User, a host profile can be created, e.g., based on the Seeker's email address of phone number, etc., as shown at 116.

Continuing with the description of FIG. 1 and process 100, the Connector can select a contact (e.g., contact information such as a phone number, email address, etc.) to user to connect with the Seeker, as shown at 120. The Connector can be offered the option to add a message that will be sent to both parties (Seeker and Provider) and then can send the message, as shown at 118. The message may be different depending on whether the parties are SwishLinks Users, as shown at 124 and 130. For example, the process can consider whether the Seeker is a SwishLinks User, as shown at 124 (as a question, with conditional branches to 122 and 128). If the Seeker is not a SwishLinks User, a short-message service (SMS) message, or "text message," or email can be sent to the Seeker; the message received by the Seeker can include a Web link with options to accept or decline the introduction, as shown at 122. If the Seeker is a SwishLinks User, the Seeker receives a request in the SL-App (resident on the Seeker's mobile device) to accept or decline the introduction, as shown at 128.

With continued reference to FIG. 1, the process 100 can further consider whether the Seeker accepts the introduction, as shown at 126 (as a question, with conditional branch to 130 shown; the branch declining the introduction is not shown in the interest of clarity). Upon the Seeker's acceptance, the process can consider whether the Provider is a SwishLinks User, as shown at 130 (as a question, with conditional branches to 132 and 134). If the Provider is not a SwishLinks User, a ghost profile can be created (if it doesn't already exist), e.g., based on the Provider's email address or phone number, as shown at 132. If not a SwishLinks User, a SMS message or email message can be sent to the Provider (depending on the Connector's selection); the message can include a Web link with options to accept or decline the introduction, as shown at 138. If the Provider is a SwishLinks User, the Provider receives a request in the SwishLinks App to accept or decline the introduction, as shown at 134. The process 100 can consider whether the Provider accepts the introduction, as shown at 136 (as a question, with conditional branch to 140 shown for the case the Provider accepts the introduction; the case where the Provider declines the introduction is omitted for clarity). The Seeker and Provider are connected in the SwishLinks App when the Provider accepts the introduction, as shown at 140.

As a result of process 100, the Connector can connect a Seeker to a Provider with a minimum or reduced number of gestures as inputs to a mobile device, compared with prior art techniques. In exemplary embodiments, the connection gestures are mirror images (or are essentially mirror images) of one another (e.g., are reciprocal or reversed motion). For example, a swiping of a finger from right to left (or vice versa) for one selection and the reverse motion, i.e., swiping of the finger from left to right (or vice versa) for the other selection. In exemplary embodiments, selections are made by a user swiping a finger from left to right or right to left. The detection of the user's input (e.g., a finger-drag or swipe), can include (i) detecting a user's finger on an area of the screen; (ii) detecting a swipe action from left to right or from right to left; and, (iii) consideration of an angle of the gesture with the horizontal and a delta time. The implementation of gesture handling can be different per platform, e.g., type of mobile device and operating system.

For example, for current versions of the i Operating System, or, "iOS," Apple Inc.'s operating system used for iPhones), GestureRecognizers can be used to handle the conflict of gestures. It is a native class that automatically detects a "pan" based on their native variables. Then, when a pan gesture is observed, those that are within a specified range, e.g., 45 degrees from the horizontal (+45° to −45°)are captured; an optional check can also be made to check if the velocity is not too high vertically. Checking the velocity allows the SwipableItem to ignore horizontal swipes that occur by mistake when a user swipes fast (vertically), as may be the case when the user is scrolling through a list. Of course, while plus and minus 45 degrees is described as a suitable range, other ranges can be used within the scope of the disclosure, e.g., +50° to −50°; +60° to −60°; furthermore, the ranges are not required to be symmetrical but rather can have different plus and minus values, e.g., +50° to −40°, +40° to −50°, etc.

As another example, for the Android OS, "scaled touch slops" can be used to detect when a user is starting a "pan" gesture. Using a touch slop allows for precision (in gesture determination) because the value will be automatically adjusted to the device's screen size and density. To handle the gesture conflict, the native methods OnTouch and OnInterceptTouchEvent can be used. Scrolling events that are longer than the touchslop on the X axis are intercepted. All other events go through. If the user scrolls vertically, the parent ListView will intercept the vertical scrolling.

The time period over which a gesture occurs (time delta) can be considered for an input gesture (e.g., a swipe). The velocity of an input gesture swipe can be considered in addition to or instead of the time delta. The extent of the input gesture (e.g., finger-dragging or swipe motion) can be considered when detecting a user input. For example, a certain percentage of the width of the covered section can be selected, e.g., 80%, to recognize a user's input motion as a swipe motion; other thresholds and ranges may of course also be used. For example, assuming a mobile's screen has 100 logical pixels in width (the exact number of pixel depends on the device's screen density), if the user has swiped more than 80 logical pixel left or right, the control would be snapped to the left or to the right. If the user releases the item before that, it would snap back to the original position. While one percentage of the width is give as an example, others may of course be used, e.g., 75%, 76%, 85%, 70%, 72%, etc.; any suitable value may be used.

Figure 2:
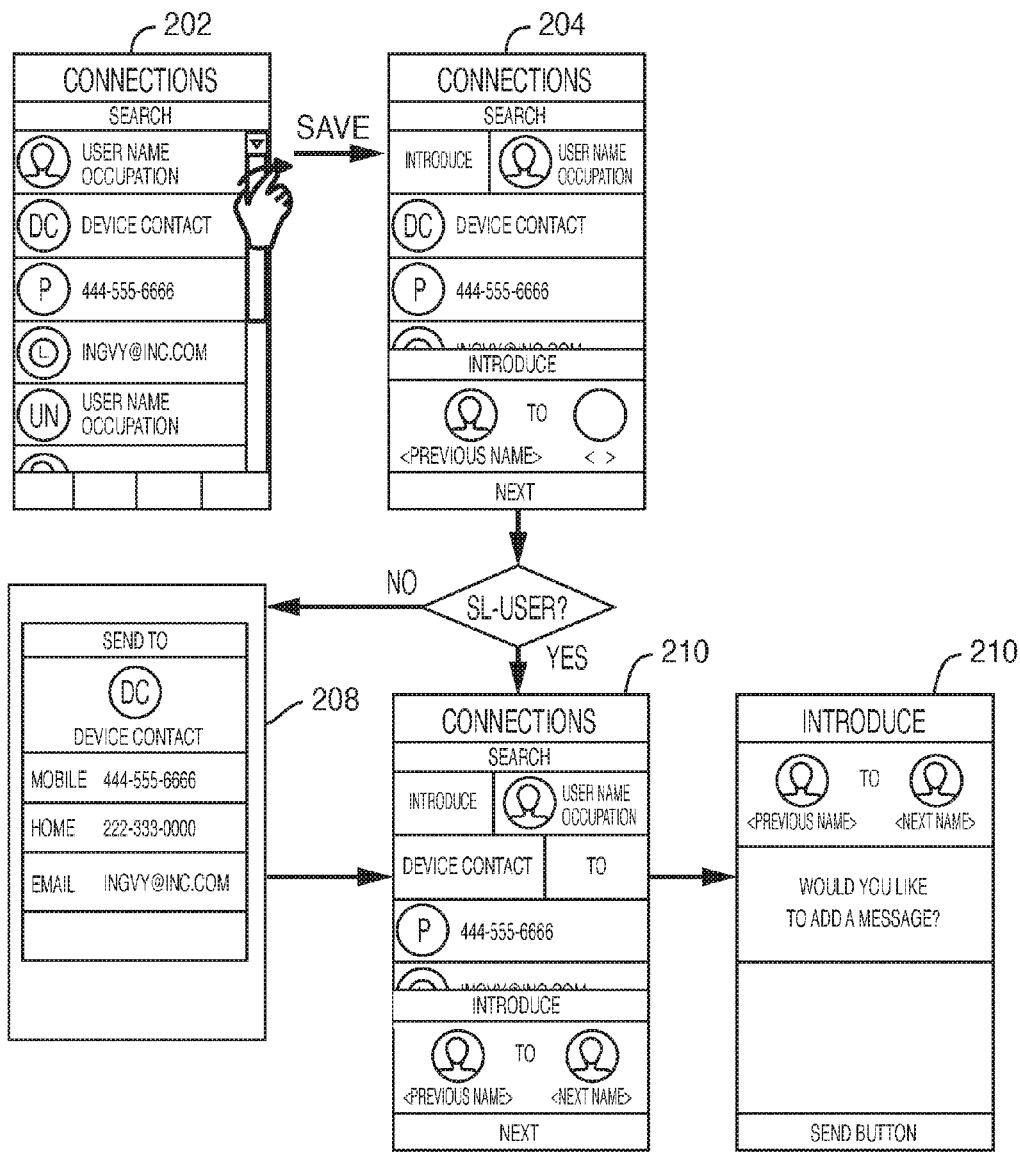
FIG. 2 illustrates an example the user experience in the process of introducing the Seeker to the Provider.

FIG. 2 depicts an example of a how a user could use the SwishLinks App 200 resident on a mobile device to connect other users. The process (SwishLinks App) 200 may accordingly connect two or more people (one to one, one to many or many to one) with a simple gesture or gestures. Multiple device screenshots (202-204, 208-212) are shown, depicting the user experience. An inquiry as to whether a user is a SwishLinks User is shown (as a question, with conditional branches to 208 and 210). A summary of the progression of the user experience is shown in table 214, describing steps 1-5. At Step 1, the user swipes to the right across the screen of the mobile device. This reveals an "Introduce" status indicator and launches a "Swishing" summary panel. At Step 2, the user swipes to the left. That motion reveals a status indicator and launches the Swishing summary panel, if it is not already open. At Step 3, the user can input a message to send to the Provider and/or Seeker. At Step 5, the Seeker and Provider names are displayed.

Figure 3:
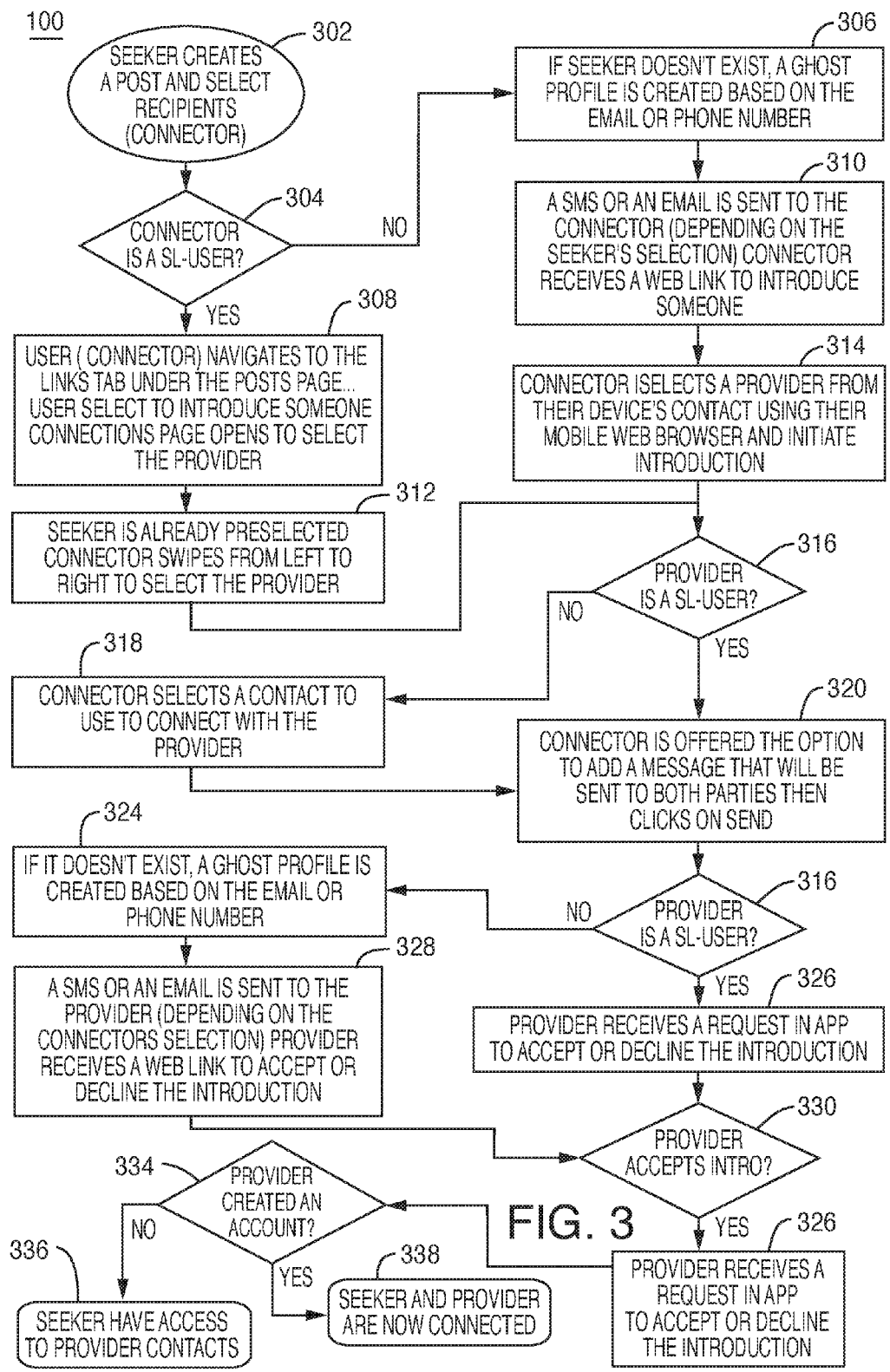
FIG. 3 is a flow chart that illustrates an example the process of looking for someone in order to complete a project by creating a post by looking for a specific skill or occupation in accordance.

FIG. 3 shows a flow chart that illustrates a process 300 of looking for someone in order to complete a project by creating a post by looking for a specific skill or occupation in accordance with an example of an embodiment of the present disclosure. As a high-level summary of FIG. 3, a user creating a post, e.g., a Seeker, can select recipients that can act as Connector to connect the Seeker to a Provider. The Seeker creates a post by entering the type of skill they are looking for and then selects the recipients that can receive the post in order to introduce someone. A recipient, in this case the Connector, can be a SL-USER or not. When they are, an in-app post is accessed from the Links tab under the posts page. When they are not users a ghost profile account is created and a web link is sent to them to be able to introduce someone without the need to create an account.

With continued reference to FIG. 3, process 300 is now described in more detail. A Seeker creates a post and selects one or more recipients that are to act as a Connector, as shown at 302. Process 300 can consider/determine whether each Connector is a SwishLinks User, as shown at 304 (as a question, with conditional branches to 306 and 308). If a Connector is not a SwishLinks User, a ghost profile is created (if it doesn't already exist) based on contact information, e.g., an email address, or phone number, as shown at 306. A message is sent to the Connector (depending on the Seeker's selection), as shown at 310; the Connector receives a Web link to introduce someone. The Connector selects a Provider from their device's contacts list using their mobile Web browser and initiates an introduction, as shown at 314.

Continuing with the description of process 300, if the Connector is a SwishLinks User, the Connector navigates to the Links Tab in the SL-App under the Posts page, and then selects Introduce Someone, as shown at 308. The Seeker in this case is already preselected, and the Connector swipes from left to right to select the Provider, as shown at 312. A determination/consideration of whether the Provider is a SwishLinks User can be made, as shown at 316 (as a question, with conditional branches to 318 and 320). For the case that the Provider is not a SwishLinks User, the Connector selects a contact (contact information such as email address or phone number) to use to connect with the Provider, as shown at 318. The Connector is offered the option to add a message that will be sent to both parties, then the Connector selects Send, as shown at 320. An introduction message is then sent to both parties.

The form of the introduction message can differ, depending on whether the Provider is a SwishLinks User. A determination of whether the Provider is a SwishLinks User is shown at 322. If the Provider is not a SwishLinks User, a ghost profile is created (if it doesn't already exist) based on the email address or phone number, as shown at 324. If the Provider is not a SwishLinks User, a SMS message or an email is sent to the Provider (depending on the Connector's selection) and the Provider receives a Web link with options to accept or decline the Introduction, as shown at 328. If the Provide is a SwishLinks User, the Provider receives a request in the SL-App to accept or decline the Introduction, as shown at 326. The Provider is given the option to accept or decline the Introduction, as shown at 330 (as a question, with conditional branch to 332; the branch declining the Introduction is omitted for clarity). The Seeker receives a request in the SL-App to accept or decline the Introduction, as shown at 332. A determination can be made as to whether the Provider created a SL account, as shown at 334 (as a question, with conditional branches to 336 and 338). If the Provider has not created a SL account, the Seeker is granted access to the Provider's contacts, as shown at 336. If the Provider has created a SL account, the Seeker and Provider are connected, as shown at 338.

Figure 4:
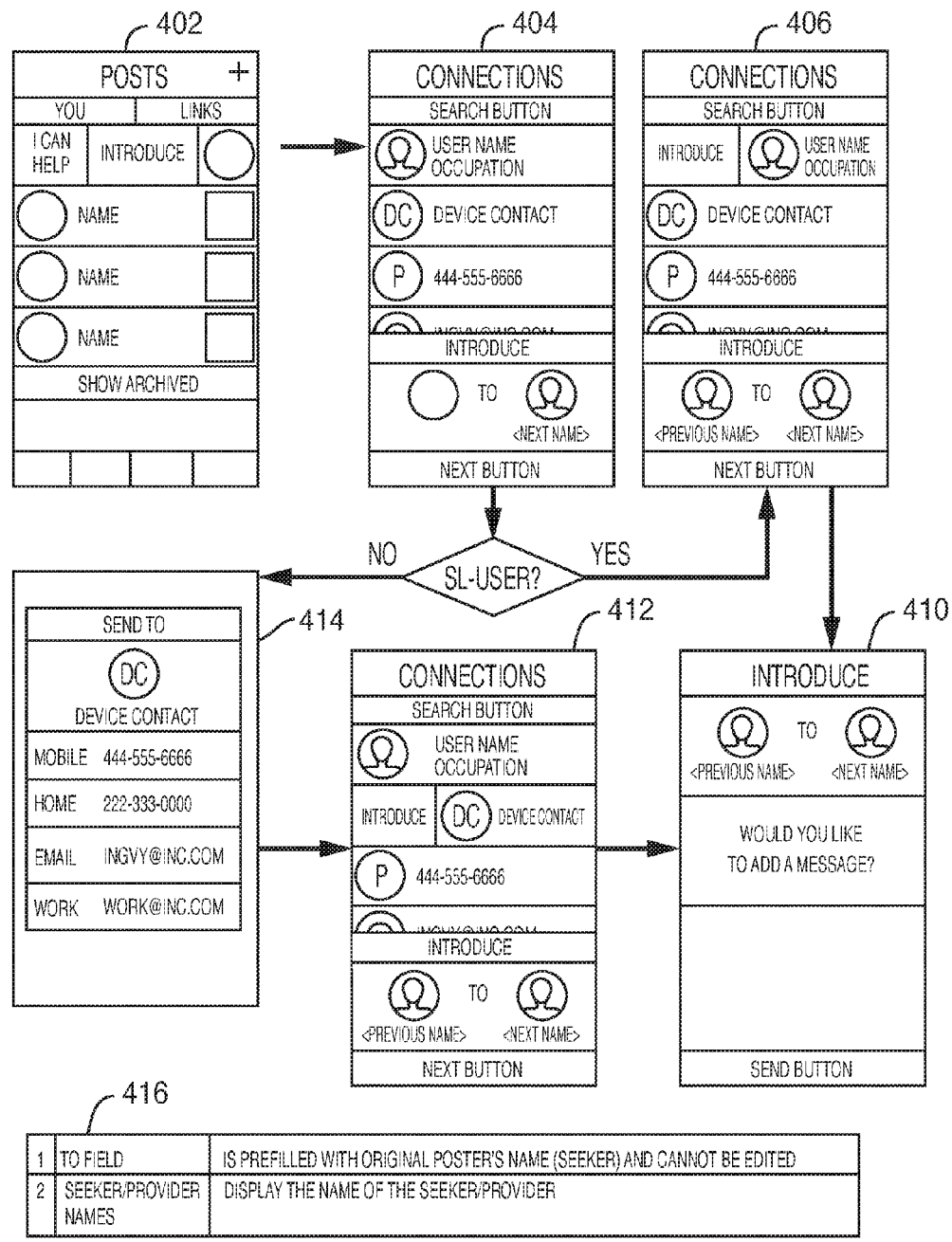
FIG. 4 illustrates an example the user experience in the process of looking for someone in order to complete a project by creating a post by looking for a specific skill or occupation.
Figure 5A:
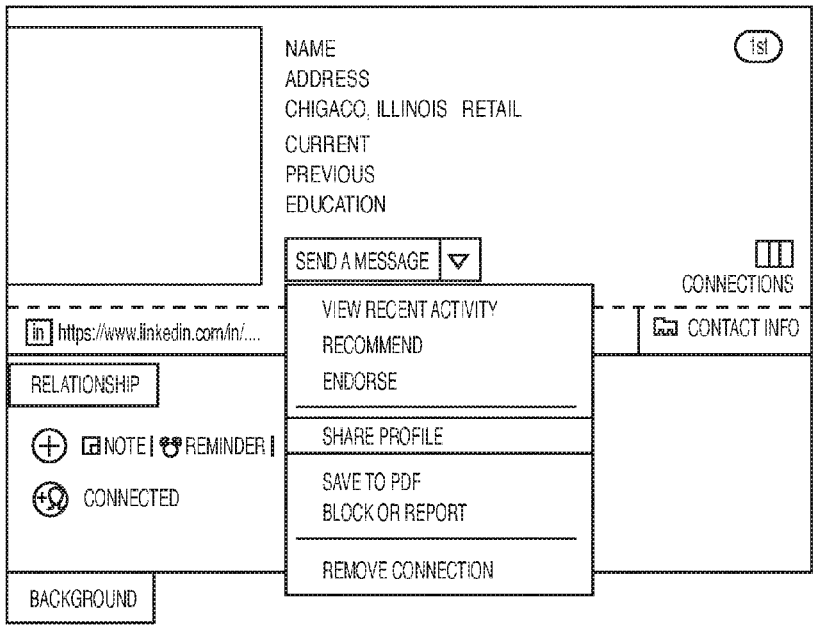
FIGS. 5A-E depict various differences between an example of the subject technology and a prior-art software application.
Figure 5B:
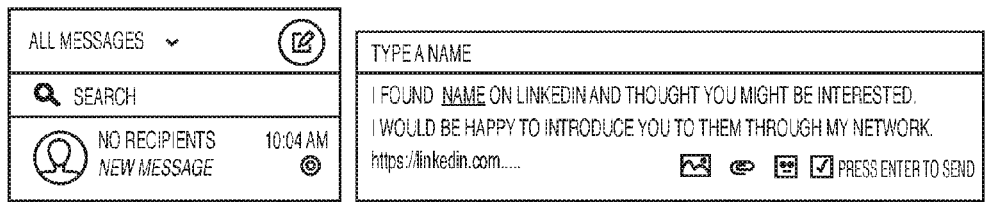
Figure 5C:
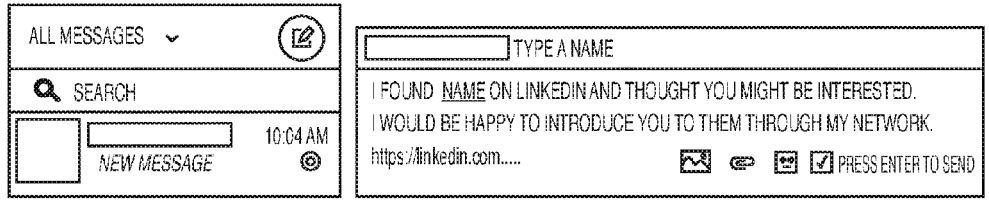
Figure 5D:
Figure 5E:
Figure 6C:
Figure 7A:
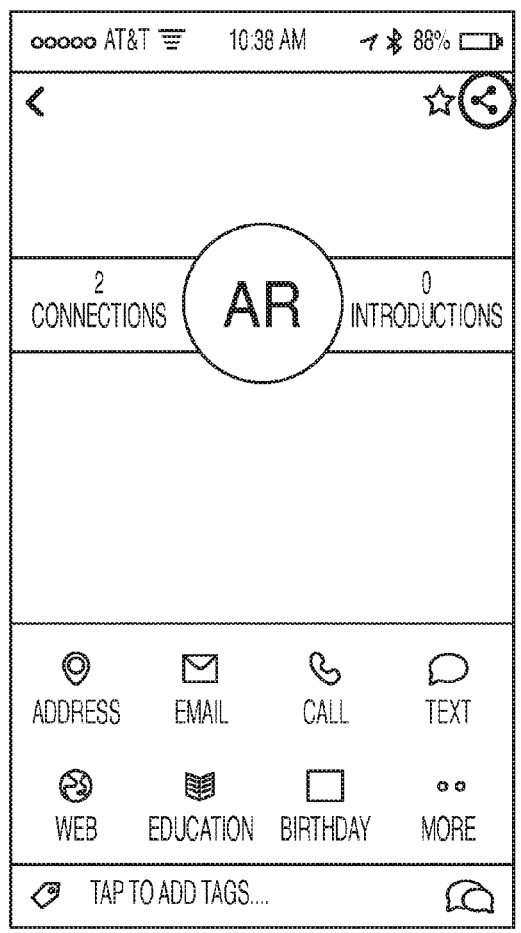
FIGS. 7A-C depict various differences between an example of the subject technology and a further prior-art software application.
Figure 7B:
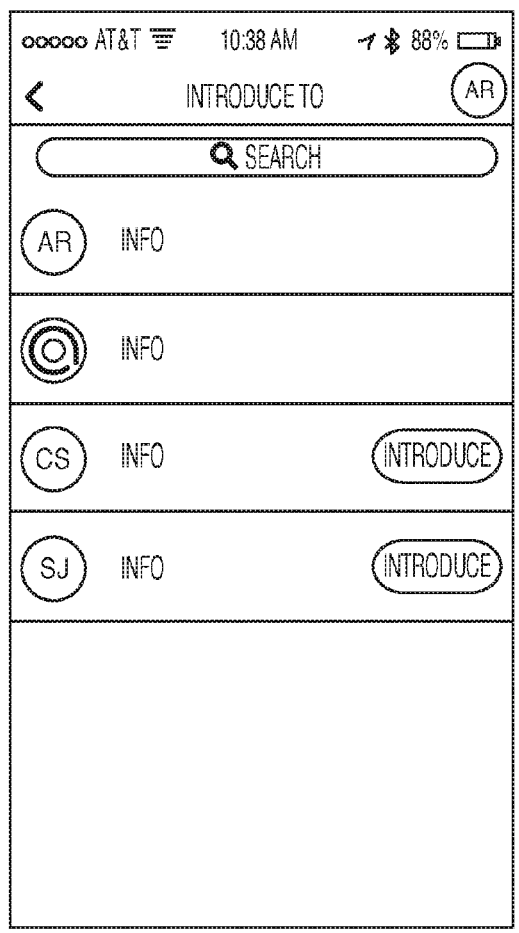
Figure 7C:
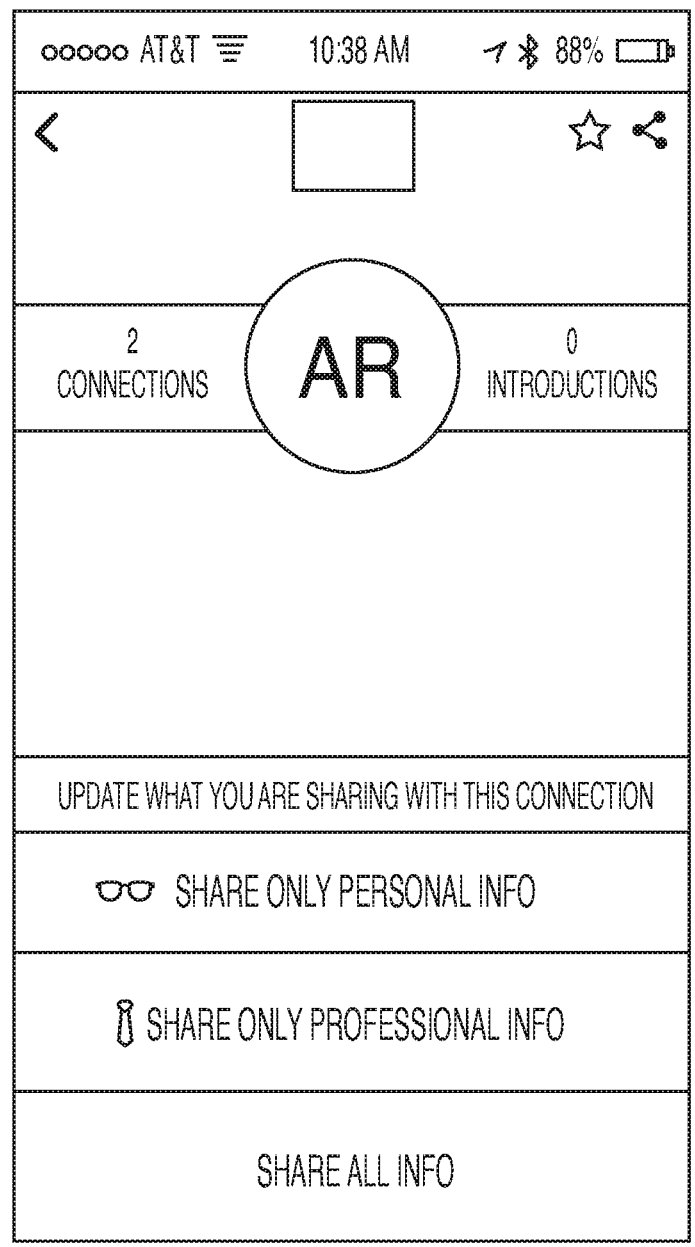

FIG. 4 illustrates the user experience in the process 400 of looking for someone in order to complete a project by creating a post by looking for a specific skill or occupation in accordance with an example of an embodiment of the present disclosure. The user experience is indicated by screenshots 402-406 and 410-414 and is generally similar to the one shown and described for FIG. 2. Table 416 shows Steps 1-2. Step 1, relating to the "To" field, shows that the To field is prefilled with the Original Poster's name (Seeker) and cannot be edited. At Step 2, the Seeker/Provider name(s) are displayed.

FIGS. 5A-F depict various differences between embodiments of the present disclosure and a prior-art software application.

FIGS. 6A-D depict various differences between embodiments of the present disclosure and another prior-art software application.

FIGS. 7A-D depict various differences between embodiments of the present disclosure and a further prior-art software application.

Provided below are comparisons of exemplary embodiments of the disclosure (referred to as "SwishLinks") to prior techniques and applications:

LinkedIn

| Feature | LinkedIn | SwishLinks |
|---|---|---|
| Facilitate an introduction between platform users. | Yes | Yes |
| Facilitate an introduction between non-users. | No | Yes |
| Request permission from involved parties for an introduction. | Yes/No | Yes |
| See a list of your connections (both non-users and users) and decide who to introduce to whom. | No | Yes |

-continued

| Feature | LinkedIn | SwishLinks |
|---|---|---|
| Swipe on a connection to select parties to be introduced. | No | Yes |
| See a list of your contact information and decide what to share in the context of an introduction. | No | Yes |
| Generate a custom contact card (vCard) that can be saved to a person's device as a contact. | No | Yes |
| Receive notifications about the status of an introduction. | Yes/No | Yes |

For "Request permission from involved parties for an introduction," the process of sending individual messages on LinkedIn may be done in such a way where permission is required from each involved party.

Regarding "Receive notifications about the status of an introduction, a LinkedIn user will receive message notifications if the conversation between the involved parties continues in the group message.

Facebook

| Feature | Facebook | SwishLinks |
|---|---|---|
| Facilitate an introduction between platform users. | Yes | Yes |
| Facilitate an introduction between non-users. | No | Yes |
| Request permission from involved parties for an introduction. | Yes/No | Yes |
| See a list of your connections (both non-users and users) and decide who to introduce to whom. | No | Yes |
| Swipe on a connection to select parties to be introduced. | No | Yes |
| See a list of your contact information and decide what to share in the context of an introduction. | No | Yes |
| Generate a custom contact card (vCard) that can be saved to a person's device as a contact. | No | Yes |
| Receive notifications about the status of an introduction. | Yes/No | Yes |

For "Request permission from involved parties for an introduction," the process of sending individual messages may be done in such a way where permission from each involved party.

Regarding "Receive notifications about the status of an introduction," a user LinkedIn user will receive message notifications if the conversation between the involved parties continues in the group message. A LinkedIn user will receive notifications when there is a response to a post that the user created or responded to.

Atmospheir

| Feature | Facebook | SwishLinks |
|---|---|---|
| Facilitate an introduction between platform users. | Yes | Yes |
| Facilitate an introduction between non-users. | No | Yes |
| Request permission from involved parties for an introduction. | Yes | Yes |
| See a list of your connections (both non-users and users) and decide who to introduce to whom. | No | Yes |
| See a list of your contact information and decide what to share in the context of an introduction. | No | Yes |
| Swipe on a connection to select parties to be introduced. | No | Yes |
| Generate a custom contact card (vCard) that can be saved to a person's device as a contact. | No | Yes |
| Receive notifications about the status of an introduction. | Yes | Yes |

An example of a general method of connecting includes:

A touchscreen-user-interface-implemented method for connecting one or more members of a first group to one or more members of a second group, the method including:
 monitoring a user input area of a touchscreen user interface;
 from the user input area, receiving a user indication that a connection between a member of the first group and a member of the second group is to be made;
 in response to the user connection indication, importing a list of members of the first group and displaying the list in the user interface;
 after displaying the list and while monitoring the user input area, receiving a first user swipe input as a detected first user-finger-dragging motion;
 verifying that the time elapsed between the beginning and completion of the first user-finger-dragging motion is within a predetermined range and constitutes a single continuous motion, thereby recognizing a first swipe motion;
 upon verifying the time and continuity of the user's first swipe motion, indicating in the user interface a selection of a member of the first group;
 while monitoring the user input area, receiving a second user swipe input as a detected second user-finger-dragging motion;
 verifying that the time elapsed between the beginning and completion of the second user-finger-dragging motion is within a predetermined amount of time and constitutes a single continuous motion, thereby recognizing a second swipe motion;
 upon verifying the time and continuity of the user's second swipe motion, indicating in the user interface a selection of a member of the second group; and
 updating a list of connections to indicate that the a member of the first group is connected to a member of the second group; and
 displaying a visual indication on the graphical user interface indicating that the member of the first group and member of the second group are connected. The step of updating a list of connections can include updating a database of the backend; the step of updating a list of connections can include updating a table or list of the frontend.

The description herein of embodiments and examples of the disclosure is centralized on the Frontend experience and the simplicity of connecting two or more persons. A backend is used for embodiments of the disclosure, though such use will normally be transparent (i.e., not seen) by a user. Any suitable database(s) and server(s) may be used as or for such backend.

Unless otherwise indicated, the mobile applications that have been discussed herein are implemented with a specially-configured computer or computing system, e.g., mobile device, specifically configured to perform the functions that have been described herein for the applications.

Each computer system or device can include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system or device may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function. Any suitable programming language may be used for such software and application (Apps); suitable examples include, but are not limited to C, C++, C#, Java, Python, R, PHP, JavaScript, Ruby, Go, Ladder Logic, HTML and bash.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, or the discussions relating to them, is intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, while exemplary embodiments are described as introducing one user to another, as was mentioned above the scope of the present disclosure is not limited to such. Other embodiments of the present disclosure may be utilized to introduce (i) a job to person, (ii) a business (e.g., a restaurant, company, etc.) to person, (iii) places (tourism, historic, etc.) to person, (iv) file sharing (e.g., pictures, videos, documents, etc.) to person, and/or (v) location (e.g., a GPS location) to a person, Furthermore, while exemplary embodiments are described herein in the context of one user sending information or connecting to a single other user, the present disclosure is not limited to such. For example, the following types of connections, or mappings, between users are included: (i) one to one (a member of a first group is connected to a member of a second group), (ii) one to many (a member of a first group is connected to multiple members of a second group), (iii) many to one (multiple members of a first group are connection to a member of a second group), and (iv) many to many (multiple members of one group are connected to multiple members of a second group).

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Accordingly, embodiments of the present disclosure provide benefits and advantages over prior techniques. Embodiments of the present disclosure can allow or facilitate users to move away from communicating and networking through techniques such as email. Exemplary embodiments can provide users of touchscreens to be able to link up with other users (e.g., peers) via social media applications in a simple and quick manner.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A computer-implemented memory-efficient method utilizing a touchscreen for connecting users within a network of users, the method comprising:
   with a processor, monitoring a user input area of a touchscreen user interface;
   from the user input area, the processor receiving a user indication that a connection between a seeker and a provider is to be made;
   in response to the user connection indication, the processor importing a list of contacts and displaying the list in the user interface;
   after displaying the list and while monitoring the user input area, the processor receiving a first user swipe input as a detected first user-finger-dragging motion;
   with the processor, verifying that the time elapsed between the beginning and completion of the first user-finger-dragging motion is within a predetermined range and constitutes a single continuous motion, thereby recognizing a first swipe motion;
   upon verifying the time and continuity of the user's first swipe motion, the processor indicating in the user interface a selection of a provider;
   while continuing to monitor the user input area, the processor receiving a second user swipe input as a detected second user-finger-dragging motion;
   with the processor, verifying that the time elapsed between the beginning and completion of the second user-finger-dragging motion is within a predetermined amount of time and constitutes a single continuous motion, thereby recognizing a second swipe motion;
   upon verifying the time and continuity of the user's second swipe motion, the processor indicating in the user interface a selection of a seeker;
   after indication of the selection of the seeker, the processor receiving a user input initiating electronic transmission of an introduction message to the selected seeker;
   receiving an electronic acceptance of the introduction message from the selected seeker;
   after receiving the electronic acceptance from the seeker, electronically sending a request to the provider to accept or decline the introduction;
   receiving an electronic acceptance of the introduction message from the provider; and
   in response to the provider accepting the introduction, the processor displaying a visual indication on the graphical user interface indicating that the provider and seeker are connected; and
   wherein the first swipe motion and second swipe motion are in opposite directions to one another.

2. The method of claim 1, wherein the first swipe motion is from left to right on the mobile touch screen.

3. The method of claim 1, wherein the second swipe motion is from right to left on the mobile touch screen.

4. The method of claim 1, wherein the first swipe motion is from right to left on the mobile touch screen.

5. The method of claim 1, wherein the second swipe motion is from left to right on the mobile touch screen.

6. The method of claim 1, further comprising revising a database linked to the user interface to indicate that the provider and seeker are connected.

7. The method of claim 1, wherein verifying the user's first swipe motion further includes verifying that the angle of the swipe motion with respect to a horizontal axis of the user interface is within a predetermined range.

8. The method of claim 1, wherein verifying the user's second swipe motion further includes verifying that the angle of the swipe motion with respect to a horizontal axis of the user interface is within a predetermined range.

9. A non-transitory, tangible, computer-readable storage medium containing a program of instructions that causes a computer system having a processor running the program of instructions to:
   monitor a user input area of a touchscreen user interface;
   from the user input area, receive a user indication that a connection between a seeker and a provider is to be made;
   in response to the user connection indication, import a list of contacts and display the list in the user interface;
   after the list of contacts is displayed and while the user input area is monitored, receive a first user swipe input as a detected first user-finger-dragging motion;
   verify that the time elapsed between the beginning and completion of the first user-finger-dragging motion is within a predetermined range and constitutes a single continuous motion, thereby recognizing a first swipe motion;
   upon verification of the time and continuity of the user's first swipe motion, indicate in the user interface a selection of a provider;
   while continuing to monitor the user input area, receive a second user swipe input as a detected second user-finger-dragging motion;
   verify that the time elapsed between the beginning and completion of the second user-finger-dragging motion is within a predetermined amount of time and constitutes a single continuous motion, thereby recognizing a second swipe motion;
   upon verification of the time and continuity of the user's second swipe motion, indicate in the user interface a selection of a seeker;
   after indication of the selection of the seeker, receive a user input initiating electronic transmission of an introduction message to the selected seeker;
   receive an electronic acceptance of the introduction message from the selected seeker;
   after receipt of the electronic acceptance from the seeker, electronically send a request to the provider to accept or decline the introduction;
   receive an electronic acceptance of the introduction message from the provider; and
   in response to the provider acceptance of the introduction, display a visual indication on the graphical user interface indicating that the provider and seeker are connected; and
   wherein the first swipe motion and second swipe motion are in opposite directions to one another.

10. The non-transitory, tangible, computer-readable storage medium of claim 9, wherein the program further comprises instructions to recognize a finger-dragging motion from left to right on the mobile touch screen as the first swipe motion.

11. The non-transitory, tangible, computer-readable storage medium of claim 9, wherein the program further comprises instructions to recognize a finger-dragging motion from right to left on the mobile touch screen as the second swipe motion.

12. The non-transitory, tangible, computer-readable storage medium of claim 9, wherein the program further comprises instructions to recognize a finger-dragging motion from right to left on the mobile touch screen as the first swipe motion.

13. The non-transitory, tangible, computer-readable storage medium of claim 9, wherein the program further comprises instructions to recognize a finger-dragging motion from left to right on the mobile touch screen as the second swipe motion.

14. The non-transitory, tangible, computer-readable storage medium of claim 9, wherein the program further comprises instructions to revise a database linked to the user interface to indicate that the provider and seeker are connected.

15. The non-transitory, tangible, computer-readable storage medium of claim 9, wherein the program further comprises instructions to verify the user's first swipe motion by verifying that the angle of the swipe motion with respect to a horizontal axis of the user interface is within a predetermined range.

16. The non-transitory, tangible, computer-readable storage medium of claim 9, wherein the program further comprises instructions to verify the user's first swipe motion by verifying that the angle of the swipe motion with respect to a horizontal axis of the user interface is within a predetermined range.

17. A computing device comprising:
a touchscreen having a touchscreen user interface;
one or more processors;
memory; and
one or more programs, wherein the one or more programs are stored in the memory and configured to be executed by the one or more processors, the one or more programs including:
instructions for:
monitoring a user input area of the touchscreen user interface;
from the user input area, receiving a user indication that a connection between a seeker and a provider is to be made;
in response to the user connection indication, importing a list of contacts and displaying the list in the user interface;
after displaying the list and while monitoring the user input area, receiving a first user swipe input as a detected first user-finger-dragging motion;
verifying that the time elapsed between the beginning and completion of the first user-finger-dragging motion is within a predetermined range and constitutes a single continuous motion, thereby recognizing a first swipe motion;
upon verifying the time and continuity of the user's first swipe motion, indicating in the user interface a selection of a provider;
while continuing to monitor the user input area, receiving a second user swipe input as a detected second user-finger-dragging motion;
verifying that the time elapsed between the beginning and completion of the second user-finger-dragging motion is within a predetermined amount of time and constitutes a single continuous motion, thereby recognizing a second swipe motion;
upon verifying the time and continuity of the user's second swipe motion, indicating in the user interface a selection of a seeker;
after indication of the selection of the seeker, receiving a user input initiating electronic transmission of an introduction message to the selected seeker;
receiving an electronic acceptance of the introduction message from the selected seeker;
after receiving the electronic acceptance from the seeker, electronically sending a request to the provider to accept or decline the introduction;
receiving an electronic acceptance of the introduction message from the provider; and
in response to the provider accepting the introduction, displaying a visual indication on the graphical user interface indicating that the provider and seeker are connected; and
wherein the first swipe motion and second swipe motion are in opposite directions to one another.

18. The computing device of claim 17, wherein the first swipe motion is from left to right on the mobile touch screen.

19. The computing device of claim 17, wherein the second swipe motion is from right to left on the mobile touch screen.

20. The computing device of claim 17, wherein the first swipe motion is from right to left on the mobile touch screen.

21. The computing device of claim 17, wherein the second swipe motion is from left to right on the mobile touch screen.

22. The computing device of claim 17, further comprising revising a database linked to the user interface to indicate that the provider and seeker are connected.

23. The computing device of claim 17, wherein verifying the user's first swipe motion further includes verifying that the angle of the swipe motion with respect to a horizontal axis of the user interface is within a predetermined range.

24. The computing device of claim 17, wherein verifying the user's second swipe motion further includes verifying that the angle of the swipe motion with respect to a horizontal axis of the user interface is within a predetermined range.

* * * * *